United States Patent
Kostic et al.

(10) Patent No.: US 9,467,950 B2
(45) Date of Patent: Oct. 11, 2016

(54) METHOD FOR ADJUSTING FORWARD LINK POWER CONTROL PARAMETERS BASED ON FORWARD LINK QUALITY FEEDBACK IN WIRELESS NETWORK

(75) Inventors: Andrew R. Kostic, Lincoln Park, NJ (US); Charles Albert Sanders, Bridgewater, NJ (US); Susan Wu Sanders, Bridgewater, NJ (US); Carl Francis Weaver, Morris Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2251 days.

(21) Appl. No.: 11/353,403

(22) Filed: Feb. 14, 2006

(65) Prior Publication Data

US 2007/0191044 A1    Aug. 16, 2007

(51) Int. Cl.
*H04B 7/00* (2006.01)
*H04W 52/14* (2009.01)
*H04W 52/12* (2009.01)
*H04W 52/40* (2009.01)

(52) U.S. Cl.
CPC .......... *H04W 52/143* (2013.01); *H04W 52/12* (2013.01); *H04W 52/40* (2013.01)

(58) Field of Classification Search
USPC ...................................................... 455/522
See application file for complete search history.

(56) References Cited

U.S. PATENT DOCUMENTS

| | | | | |
|---|---|---|---|---|
| 5,999,816 A | * | 12/1999 | Tiedemann et al. | 455/437 |
| 6,304,562 B1 | * | 10/2001 | Kim et al. | 370/332 |
| 6,728,226 B1 | * | 4/2004 | Naito | 370/328 |
| 2002/0132621 A1 | * | 9/2002 | Takano et al. | 455/435 |
| 2005/0130688 A1 | * | 6/2005 | Hashem et al. | 455/522 |

* cited by examiner

*Primary Examiner* — Ankur Jain
(74) *Attorney, Agent, or Firm* — McCormick, Paulding & Huber, LLP

(57) ABSTRACT

A system is implemented on a wireless network for adjusting a forward link power control parameter based on forward link feedback. A wireless unit is in communication with several base stations during soft handoff, and provides feedback relating to forward link quality, e.g., forward link pilot signal strength or traffic channel frame error rate. The feedback is compared to a comparison or reference point (such as target frame error rate, or a maximum pilot signal strength in the active set) chosen for gauging the quality or nature of the feedback for power control purposes. Based on this comparison, a power control parameter of one or more of the base stations may be adjusted upwards or downward. The power control parameter may be a forward link reference transmit power level "$P_{ref}$" used to control base station power transmission levels in the presence of power control bit errors.

7 Claims, 3 Drawing Sheets

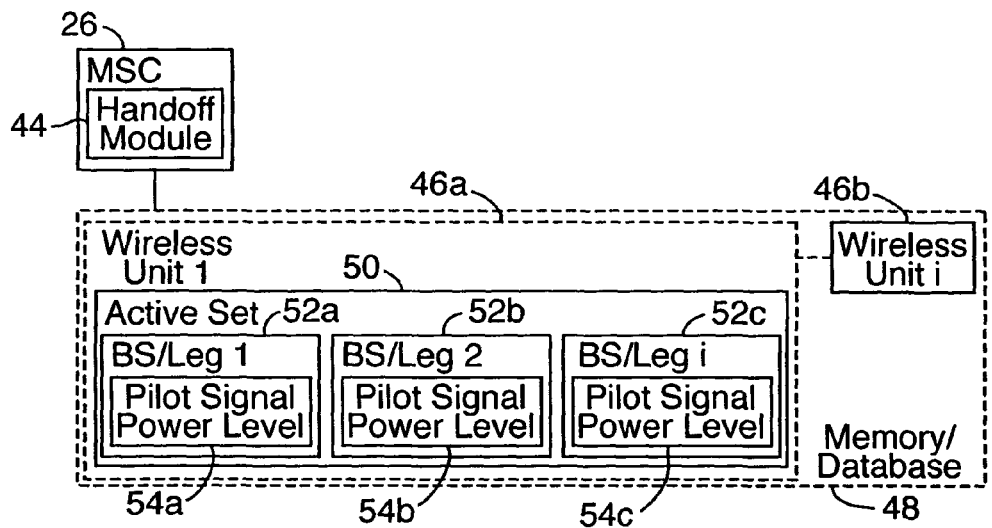
FIG. 2
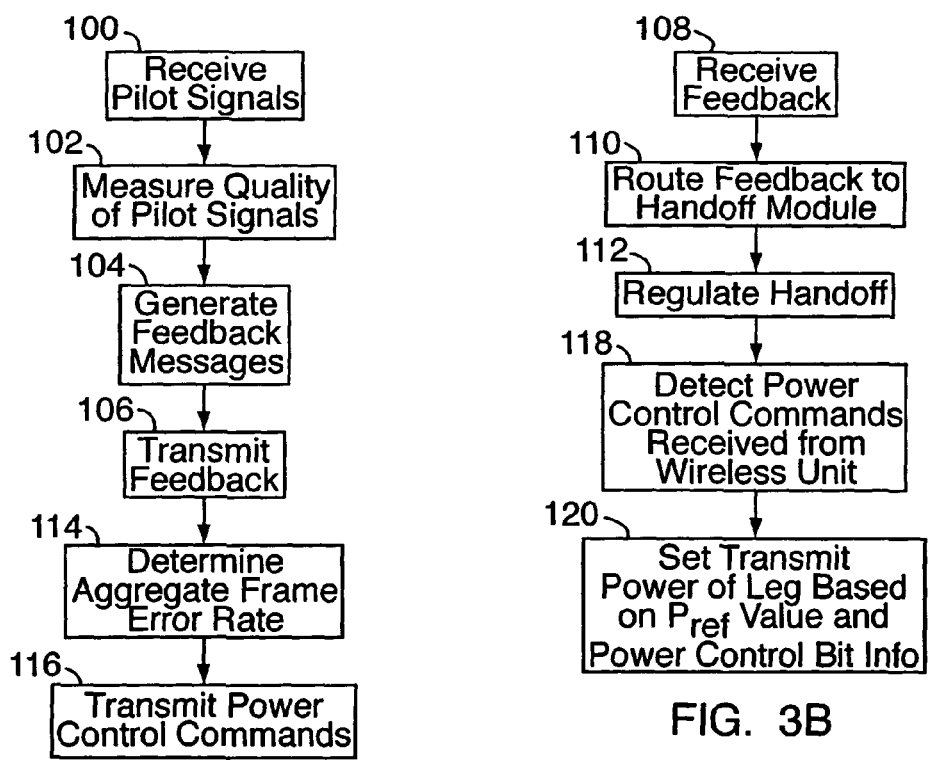
FIG. 3A
FIG. 3B

METHOD FOR ADJUSTING FORWARD LINK POWER CONTROL PARAMETERS BASED ON FORWARD LINK QUALITY FEEDBACK IN WIRELESS NETWORK

FIELD OF THE INVENTION

The present invention relates to communications and, more particularly, to wireless communication systems.

BACKGROUND OF THE INVENTION

In certain wireless, radio frequency ("RF") communication networks, e.g., those using a CDMA (code division multiple access) spread-spectrum multiplexing scheme, data and other signals are transmitted from one or more fixed base stations to one or more wireless units across a first frequency bandwidth (e.g., a 1.25 MHz bandwidth centered at a first designated frequency) known as the forward link. Transmissions from the wireless units to the base stations are across a second frequency bandwidth (e.g., a 1.25 MHz bandwidth centered at a second designated frequency) known as the reverse link. Generally, each wireless unit is allocated the entire bandwidth all the time, with the signals from individual wireless units being differentiated from one another using an encoding scheme. The forward and reverse links may each comprise a number of physical or logical traffic channels and signaling/control channels, the former primarily for carrying voice data, and the latter primarily for carrying the control, synchronization, and other signals required for implementing CDMA or other communications. Typically, a wireless network is geographically divided into contiguous cells, each serviced by a base station, and/or into sectors, which are portions of a cell typically serviced by different antennae/receivers supported on a single base station.

Concomitant with improvements in electronics technology, recently implemented standards for CDMA-based communication systems provide for the high-speed transfer of data. 1x-EVDO, for example, is an implementation of the CDMA2000® "3-G"/third generation mobile telecommunications protocol/specification configured for the high-speed wireless transmission of both voice and non-voice data. One significant improvement of 3-G CDMA technologies is enhanced forward link power control, which was adopted in the CDMA2000® standard. With enhanced forward link power control, a wireless unit transmits power control commands to a base station to request an increase (up) or a decrease (down) in forward link traffic channel power. This may be done at a rate of up to 800 Hz, for tracking the dynamics of wireless unit speed, fading, path loss, and the like. However, due to power control bit errors, this tracking is typically less than ideal. Specifically, when a call is in soft handoff, power control bit errors can occur differently amongst different handoff legs. This can result in an unintentional loss of synchronization in the traffic channel transmit power at spatially separated base stations. In effect, bit errors occurring on the reverse link cause the forward link power to unintentionally diverge. Unsynchronized forward link power among handoff legs can degrade 3-G forward link capacity. It may also degrade performance to such an extent that the frame error rate (FER) increases, which can result in dropped calls. To mitigate the problem, a forward link reference transmit power level ("$P_{ref}$") is used in addition to the power up/down commands. In the presence of power control bit errors, the transmit power is controlled to converge to the $P_{ref}$ level in a manner as set forth in the UMTS (Universal Mobile Telecommunications System) standard. This facilitates the synchronization of forward link power among handoff legs.

To explain further, the act of transferring support of a wireless unit from one base station to another is called "handoff." Handoff occurs when a call has to be handed off from one base station to another as the user moves between cells. In a traditional, "hard" handoff, the connection to the current base station is broken, and then the connection to the new base station is made. Since all the base stations in a CDMA-based network use the same frequency bandwidths, however, it is possible to make the connection to the new base station without breaking the connection to the current cell. (Each base station with a connection to the wireless unit is referred to as a "call leg" or "leg.") This is known as "soft" handoff. Soft handoff requires less power, which reduces interference and increases capacity.

For coherent wireless communications such as used in CDMA, pilot signal-assisted channel estimation schemes may be used. The forward link pilot channel/signal is an un-modulated, direct-sequence spread spectrum signal transmitted by the base stations. Pilot signal-assisted methods allow a wireless unit to acquire the timing of the forward link. They also provide a phase reference for coherent demodulation, as well as a means for signal strength comparisons between base stations for use in call handoff. In fact, one of the primary functions of the soft handoff control module/algorithm (in place on the network for controlling soft handoff) is to maintain an "active set" based on the measured pilot signal strength. In particular, a wireless unit periodically measures and reports pilot signal strengths of nearby base stations to the network. As soon as the measured strength of a pilot signal crosses a certain predefined threshold value, the base station transmitting the pilot signal may be assigned as a member of the wireless unit's active set, that is, a member of the group of base stations assigned to concurrently transmit forward link traffic channel data to the wireless unit. Originally, the active set consists of a single base station. After repeated measurements, however, other base stations are added when the measured strengths of their pilot signals exceed the predefined threshold. In a typical soft handoff algorithm, three parameters are considered: "Tadd" (the threshold for adding a base station to the active set), "Tdrop" (the lower threshold for dropping a base station from the active set), and a drop timer "T_tdrop." If a non-member pilot signal strength exceeds Tadd, the base station transmitting the signal is added to the active set. The wireless unit continues to measure the pilot signal. If it drops below Tdrop, the wireless unit starts a drop timer. If the strength of the pilot signal rises above Tdrop before the drop timer expires, the timer is disabled (in that instance) and reset. Otherwise, upon expiration of the timer the base station is removed from the active set.

As noted, when a call is in soft handoff, power control bit errors can occur in different handoff legs, which may result in a loss of power synchronization. To elaborate, in forward link power control, a wireless unit transmits power control messages over the reverse link, which are received by one or more base stations. The base stations vary the power of traffic channel signals transmitted to the wireless unit depending on the power control messages. However, because there are different signal paths between each of the base stations and the wireless unit, power control messages transmitted over the reverse link may contain bit errors. Because of these bit errors, a power control message may not be interpreted in a manner as originally intended, possibly resulting in a loss of power synchronization.

In current systems, the forward link reference transmit power level $P_{ref}$ is a fixed value independent of forward link quality. Causing the transmit power to converge to $P_{ref}$ in the presence of power control bit errors may help with forward link power mis-synchronization, as mentioned above. However, in some cases the use of $P_{ref}$ in this manner may result in an inefficient utilization of forward link power. For example, the active set may contain a base station with a weak pilot signal relative to the rest of the active set, e.g., due to an unexpired T_tdrop. (In other words, the drop timer T_tdrop has been started for the weak leg, but the weak leg has not yet been removed from the active set.) The weak leg's transmit power is around the $P_{ref}$ level. When $P_{ref}$ is high, this results in a waste of forward link transmission power.

SUMMARY OF THE INVENTION

An embodiment of the present invention relates to a method for adjusting a forward link power control parameter during communications with a wireless unit over a network, e.g., during soft handoff. Initially, a forward link feedback value of each leg in an active set of the wireless unit is compared to a forward link feedback parameter. The "active set" is a grouping of base stations ("legs") in communication with the wireless unit during soft handoff. The forward link feedback value is a measurement or some other indication of forward link signal quality, e.g., the quality of signals transmitted from the base stations to the wireless unit. The feedback parameter is a comparison or reference point for gauging the quality or nature of the feedback for soft handoff and/or power control purposes. Based on this comparison, it is determined whether to adjust the power control parameter for at least one of the legs. The power control parameter is a setting or other value used to determine the operational range of the forward link transmit power of a base station, that is, the boundaries of transmission power and/or the level of transmit power under certain operational conditions during soft handoff.

In another embodiment, the forward link feedback value for each leg is a pilot signal strength, as measured and reported by the wireless unit. The feedback parameter is the maximum pilot signal strength among all the pilot signals, and the power control parameter is a forward link reference transmit power "$P_{ref}$." During soft handoff, the forward link transmit power level of a base station or leg may converge or otherwise be set to the $P_{ref}$ level in the presence of power control bit errors from the wireless unit. Thus, the system may adjust the $P_{ref}$ level for one of the legs, e.g., downwards to a minimum $P_{ref}$ level, if the pilot signal strength of that leg is significantly less than the maximum pilot signal strength. Conceptually, this in effect "turns off" the transmit power of the weak leg (but without waiting for the leg to be removed from the active set), thereby increasing system capacity.

In another embodiment, the forward link feedback value is a frame error rate, and the feedback parameter for comparison purposes is a target or threshold frame error rate. Based on comparisons of the frame error rates and target frame error rate, and on comparisons of pilot signal strength (e.g., to a threshold value), the $P_{ref}$ level may be incrementally adjusted upwards or downwards. For example, if the pilot signal strength of each leg is below a designated threshold (indicating a weak pilot signal) and the frame error rate is above the target rate, a call drop may be likely. In such a case, increasing the $P_{ref}$ level may help to avoid the call drop.

BRIEF DESCRIPTION OF THE DRAWINGS

The present invention will be better understood from reading the following description of non-limiting embodiments, with reference to the attached drawings, wherein below:

FIG. 2 is a schematic view of a handoff module portion of the system; and

FIGS. 3A-5 are flow charts showing the operation of various embodiments of the system.

DETAILED DESCRIPTION

Figure 1:
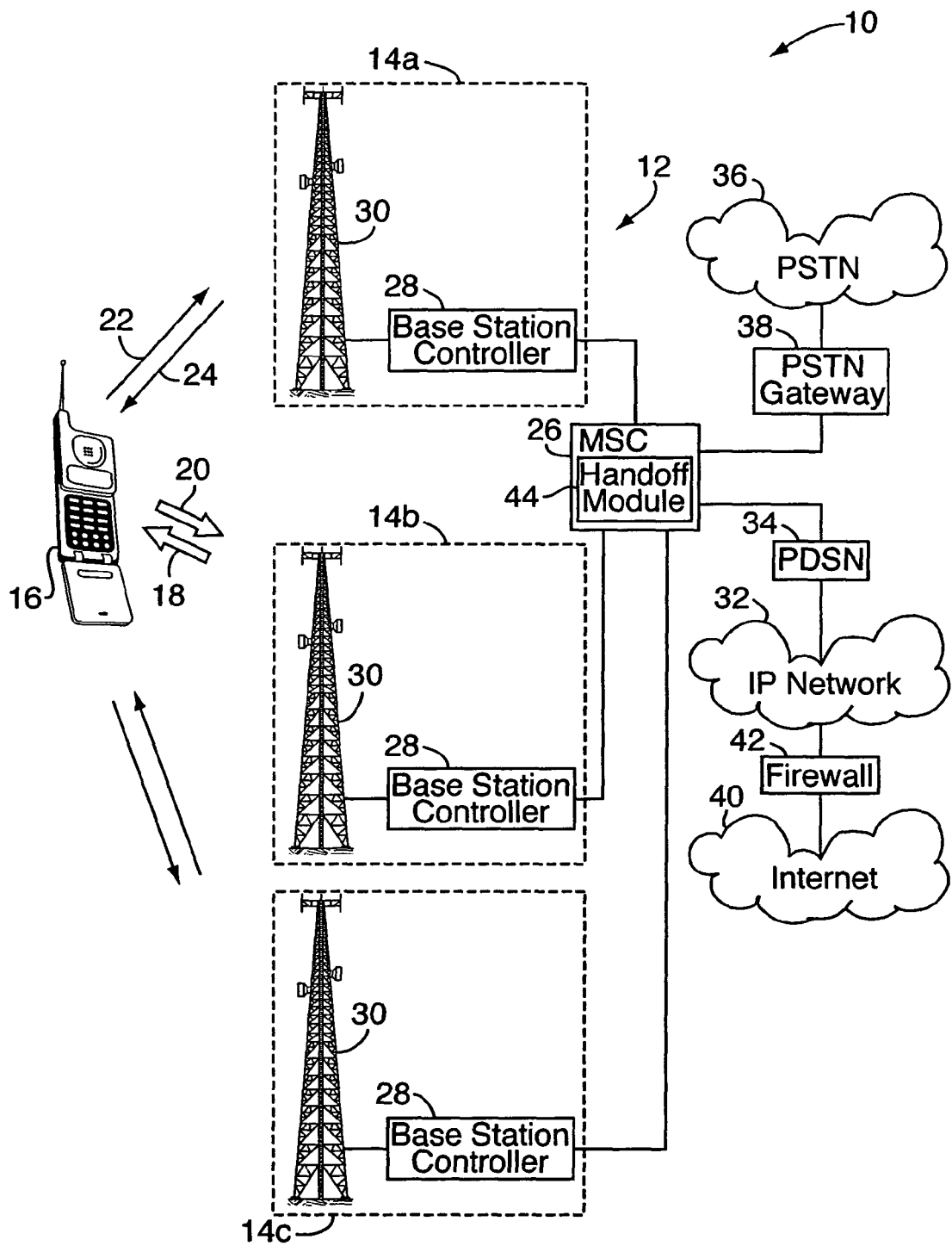
FIG. 1 is a schematic view of a system for adjusting forward link power control parameters according to an embodiment of the present invention.
Figure 4:
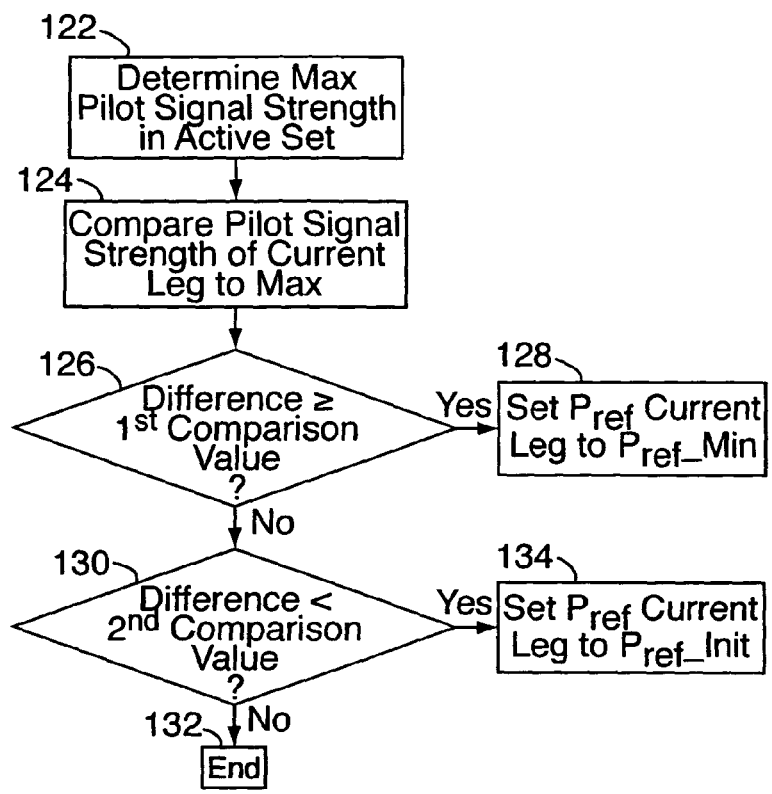

With reference to FIGS. 1-5, a system 10 is implemented on or as part of a wireless communication network 12 for dynamically adjusting forward link power control parameters based on forward link feedback. The power control parameters may be used to control base station forward traffic channel power transmission levels. The network 12 includes a plurality of fixed base stations 14a-14c and various distributed wireless units 16. (Only one wireless unit is shown in the drawings.) Transmissions from base stations to wireless units are across a forward link frequency bandwidth 18, and transmissions from wireless units to base stations are across a reverse link frequency bandwidth 20. The wireless unit 16 is in communication with one or more of the base stations 14a-14c, e.g., the wireless unit 16 may be in communication with several base stations during soft handoff. In carrying out ongoing communications, the wireless unit 16 provides feedback 22 to the system 10 regarding the signal quality of transmissions of each base station 14a-14c across the forward link 18. The feedback may relate to the strength of a forward link pilot signal 24, the forward link frame error rate, or the like. The feedback is compared to a forward link feedback parameter, by which it is meant a comparison or reference point for gauging the quality or nature of the feedback for power control and/or soft handoff purposes. For example, the feedback parameter may be a target frame error rate, a pilot signal strength threshold, or a pilot signal comparison value, e.g., a maximum pilot signal strength among all the base stations 14a-14c. Based on this comparison, a power control parameter of one or more of the base stations 14a-14c (e.g., a parameter used for determining the operational range of transmission signal strength/power) may be adjusted upwards or downwards. For example, the power control parameter may be a forward link reference transmit power level "$P_{ref}$."

The network 12 may be a CDMA-based 1x-EVDO communications network having a radio network controller and/or mobile switching center ("MSC") 26 in addition to the fixed base stations 14a-14c. The base stations 14a-14c each have a base station controller 28 and various transceivers and antennae 30 for radio communications with the wireless units 16. The wireless units 16 may include, for example, mobile phones, wireless PDA's, wireless devices with high-speed data transfer capabilities, such as those compliant with "3-G" or "4-G" standards, "WiFi"-equipped computer terminals, and the like. The MSC 26 interconnects the base stations and performs the signaling functions necessary to establish calls and other data transfer to and from the wireless units 14a-14c. It also acts as the interface between the wireless/radio end of the network 12 and the rest of the network. For example, the MSC 26 may be connected to an Internet protocol ("IP")-based network or other core packet data network 32, by way of a packet data serving node ("PDSN") 34. The MSC 26 may also be connected to a public switched telephone network ("PSTN") 36 through a PSTN gateway 38, which allows the wireless units 14a-14c to access PSTN services such as originating and receiving PSTN calls, e.g., calls to public landline phones. The core data network 32 is used for the long distance wire-line transmission of packet data, and/or to interconnect the MSC 26 with other mobile switching centers and with additional network components such as a network AAA (authentication, authorization, and accounting) module, not shown. The network 12 may also be connected to a public packet data network 40 (e.g., the Internet) through a security firewall 42 or the like. For high-speed data transmission across the packet data networks 32, 40 (e.g., for facilitating web browsing, real time file transfer, or downloading large data files), the network 12 may use the Internet Protocol ("IP"), where data is broken into a plurality of addressed data packets. Additionally, VoIP (voice over IP) may be used for voice-data transmission. (With VoIP, analog audio signals are captured, digitized, and broken into packets like non-voice data.) Both voice and non-voice data packets are transmitted and routed over the wireless network 12, where they are received and reassembled by the wireless units 16 to which the data packets are addressed.

As should be appreciated, the system 10 of the present invention is suitable for implementation on various types of wireless networks, and in particular those configured for FDD (frequency division duplex) communications. FDD is a technique in which one frequency or frequency band is used to transmit and another is used to receive. For example, as described above, CDMA is a type of FDD communications.

For carrying out ongoing communications over the network 12, each base station 14a-14c will typically transmit a pilot signal 24 over the forward link 18. The pilot signal 24 may be used for signal strength comparisons between base stations for use in call handoff. The pilot signals are received by the wireless unit 16, which subsequently periodically measures one or more characteristics of the pilot signals (e.g., signal strength) and sends feedback 22 relating to such back to the base stations 14a-14c and MSC 26. For example, with reference to FIG. 3A, at Step 100 the wireless unit 16 receives the pilot signals 24 transmitted by the base stations 14a-14c, along with whatever other information/data is also transmitted from the base stations to the wireless unit over the forward link 18. At Step 102, the wireless unit (which is provided with standard hardware and/or software for this purpose) measures a quality or characteristic of each pilot signal 24 it receives. The quality or characteristic may be a pilot signal strength-to-interference ratio "Ec/Io," a gross power in milliwatts or dBm, or the like. At Step 104, the wireless unit 16 generates one or more signal quality or other feedback messages 22. The feedback messages 22 may include signal quality information about each pilot signal received by the mobile station, namely, information that identifies the base station from which the pilot signal originated (which is determined from the encoding of the pilot signal), and a quality descriptor or other information that conveys the measured quality or characteristic, or some pre-specified function of it, of the received pilot signal. (Other information may also be provided.) A separate feedback message may be generated for each pilot signal, or a single message may be generated containing information for all the pilot signals. At Step 106, the wireless unit 16 transmits the feedback messages back to the base stations 14a-14c on the reverse link 20.

Forward link feedback may be provided to the base stations 14a-14c and/or MSC 26 in a number of different manners, depending in part on the particular characteristics of the wireless network, e.g., the components and communication protocols in place on the network. For example, the feedback may relate to forward link signals other than the pilot signals, such as a frame error rate of data transmitted over the forward link. Also, the feedback may be sent in a manner other than through feedback messages. For example, the feedback could be incorporated into power control commands generated by the wireless unit, or in other signals periodically transmitted by the wireless unit over the reverse link.

At Step 108 in FIG. 3B, the base stations 14a-14c receive the forward link feedback information 22 from the wireless unit 16. The network 12 may use the feedback information, especially that relating to pilot signal strength, for controlling soft handoff. For example, feedback data relating to pilot signal strength as measured by the wireless unit 16 may be routed to a handoff module or controller 44 in place on the MSC 26, as at Step 110. The handoff module 44 maintains a record or other data listing 46a-46b (see FIG. 2) for each wireless unit 16 actively linked to the network. The data listings may be maintained in memory or other storage 48. The data listing 46a for a wireless unit 16 contains an active set 50 for the wireless unit, which is a listing of the base stations ("BS") or legs 52a-52c temporarily associated with the wireless unit 16 for soft handoff purposes. (In the context of handoff, a base station is usually referred to as a leg or active leg, e.g., as in a leg or segment of the handoff.) The listing of each leg 52a-52c in the active set may include the pilot signal strength of the leg 54a-54c, as provided by the wireless unit 16. The data listing 46a-46c for each wireless unit may comprise solely the active set of the wireless unit, or possibly additional information. Legs 52a-52c may be added to and removed from the active set 50 in a standard manner as described above. For example, if the strength of the forward link pilot signal transmitted by a base station rises about a threshold value, the base station may be added to the active set 50. At Step 112, the handoff module 44 regulates handoff and the transmission of data traffic to the wireless unit 16, based at least in part on the active set 50, in a standard manner. For example, data traffic intended for the wireless unit may be routed to each base station included in the active set for concurrent transmission to the wireless unit 16. Typically, the wireless unit 16 is provided with information from the base station(s) and/or MSC, e.g., in a handoff direction message or the like, for informing the wireless unit of which base stations are in the active set.

For forward link power control during soft handoff, the wireless unit 16 transmits power control commands to each base station in the active set 50 to request an increase (up) or a decrease (down) in forward link traffic channel power. The particular power control command transmitted by the wireless unit 16 (e.g., up or down) to a given base station in the active set 50 may be determined based on the frame error rate of the forward traffic channel as measured by the wireless unit. Thus, at Step 114 in FIG. 3A, for the base stations in the active set, the wireless unit 16 determines an aggregate frame error rate of data traffic received from the base station(s) over the forward link 18. If the frame error rate is above a designated threshold value (e.g., 1% error rate), the wireless unit 16 transmits a power control command to increase the base station transmit power, as at Step 116. If the frame error rate is below the threshold, the transmitted power control command is for decreasing the base station transmission power. As should be appreciated, instead of transmitting an "up/down" command, the wireless unit 16 may transmit the frame error rate measurement to the base station, with the base station making the determination as whether to increase or decrease transmission power based on the frame error rate data received from the wireless unit.

At Step 118 in FIG. 3B, the base stations and/or MSC detect or otherwise determine the presence of power control commands received from the wireless unit 16. As noted, the power control commands occasionally contain bit errors, which could lead to a loss of synchronization in the power levels of the base stations 52*a*-52*c*. Thus, at Step 120, the forward link traffic channel power level of each leg is adjusted, set, or otherwise established based on the power control commands received at the base station and on the $P_{ref}$ level (the forward link reference transmit power level). In particular, the potential for convergence of the power level to $P_{ref}$ is governed by the statistics of the received up/down power control pattern. Patterns with a high bit error rate (which are essentially random bits) will converge to $P_{ref}$. Low bit error rate patterns with higher concentrations of "ups" or "downs" will converge to a required or requested power level.

To maximize forward link capacity, a power control parameter of one or more of the legs 52*a*-52*c* in the active set 50 may be adjusted upwards or downwards, based on a comparison of forward link quality feedback (received from the wireless unit 16) to one or more forward link feedback parameters. As further explained below, the forward link feedback parameter is a comparison or reference point for gauging the quality or nature of the feedback for power control purposes. The power control parameter is a parameter used by the MSC 26 or the like for determining the operational range of a base station's forward link traffic channel power level. By "operational range," it is meant boundary values (e.g., max or min) and/or the level of transmission power under certain operational conditions during soft handoff. For example, $P_{ref}$ is used for setting a base station's forward link traffic channel power level in the presence of power control command bit errors. Examples of possible power control parameters, forward link feedback, and feedback parameters are as follows:

| POWER CONTROL PARAMETER | FORWARD LINK QUALITY FEEDBACK | FORWARD LINK FEEDBACK PARAMETER |
| --- | --- | --- |
| Forward link reference transmit power level ($P_{ref}$) | Forward link pilot signal strength | Threshold/target forward link frame error rate |
| Forward link minimum power level | Forward link frame error rate | Threshold pilot signal strength |
| Forward link maximum power level | PMRM reports, PSMM messages, PPSMM messages | Maximum (strongest) pilot signal strength in active set |

As an example, the system 10 may be configured to set $P_{ref}$ for a weak leg 52*a*-52*c* in the active set 50 at a minimum level $P_{ref\_}$min, based on forward link feedback. This virtually turns off the transmit power of the weak leg and increases forward link capacity. Thus, with reference to FIG. 4A, at Step 122 the system 10 determines the maximum pilot signal strength 54*a*-54*c* of the legs 52*a*-52*c* in the active set 50 ("Ec/Io_max"). In other words, it is determined which pilot signal has a maximum signal strength value or power level among all the pilot signals transmitted by the active legs 52*a*-52*c*. At Step 124, the pilot signal strength of a current leg in the active set ("Ec/Io_current") is compared to the maximum pilot signal, by taking the difference between the two:

Maximum forward link Ec/Io−current leg forward link Ec/Io→Ec/Io_max−Ec/Io_current The "current leg" 52*a*-52*c* may be a primary leg in the active set 50 (e.g., a base station having direct control of call processing for the wireless unit), an initial leg, or a leg that at one point previously had a maximum pilot signal strength, but possibly no longer. Alternatively, each leg 52*a*-52*c* can be compared to the maximum pilot signal strength in this manner. At Step 126, it is determined if this difference is above (or, greater than or equal to) a first designated comparison value "EcIo_cbias_comp1":

Ec/Io_max−Ec/Io_current≥EcIo_cbias_comp1

EcIo_cbias_comp1 is chosen or calculated as a reference value for determining if the current leg pilot signal strength is much less than the maximum pilot signal strength. EcIo_cbias_comp1 may be a set value, or it may be calculated dynamically based on or relative to the maximum pilot signal strength. For example, it could be designated that any pilot signal at 20% or less of the level of the maximum pilot signal is considered "weak," or at least significantly less than the maximum. In such as case, EcIo_cbias_comp1 would be set at EcIo_cbias_comp1=0.8·(Ec/Io_max).

If the difference between the feedback parameter and feedback value (Ec/Io_max−Ec/Io_current) is above the comparison value, at Step 128 the $P_{ref}$ value of the current leg is set to a minimum value $P_{ref\_}$min:

IF Ec/Io_max−Ec/Io_current≥EcIo_cbias_comp1

THEN Set $P_{ref}$ to $P_{ref\_}$min

In this manner, when the current leg forward link pilot Ec/Io is much less than the strongest leg forward link pilot Ec/Io, the current leg's $P_{ref}$ point is set to a minimum value $P_{ref\_}$min. In effect, the forward link transmit power on this relatively weak leg is greatly reduced (e.g., the leg is "turned off" without being dropped from the active set), resulting in increased forward link capacity.

If the difference between Ec/Io_max and Ec/Io_current (e.g., Ec/Io_max−Ec/Io_current) is not above the first comparison value EcIo_cbias_comp1, as determined at Step 126, the process may end. However, the difference may also be compared to a second designated comparison value "EcIo_cbias_comp2," as at Step 130:

Ec/Io_max−Ec/Io_current<EcIo_cbias_comp2

If the difference is not less than EcIo_cbias_comp2, then the process ends at Step 132. Otherwise, at Step 134 the $P_{ref}$ value of the current leg is set to an initial $P_{ref}$ value "$P_{ref\_}$init":

IF Ec/Io_max−Ec/Io_current<EcIo_cbias_comp2

THEN Set $P_{ref}$ to $P_{ref\_}$init

EcIo_cbias_comp2 is a value, typically less than EcIo_cbias_comp1, chosen for indicating that the pilot signal strength of the current leg is no longer significantly less than the maximum pilot signal, e.g., no longer "weak." $P_{ref\_}$init is a designated initial or default $P_{ref}$ value of the network 12. Thus, as Ec/Io_current approaches Ec/Io_max, the difference between the two values decreases. If the difference falls under EcIo_cbias_comp2, the two values are considered "close enough" to warrant a higher $P_{ref}$ value for the current leg. As with EcIo_cbias_comp1, EcIo_cbias_comp2 may be based on the value of Ec/Io_max. For example, it could be designated that any pilot signal at 90% or more of the level of the maximum pilot signal is considered not to be significantly less than the maximum. In such as case, EcIo_cbias_comp2 would be set at EcIo_cbias_comp2=0.1·(Ec/Io_max).

In another example, when all the pilot signal strengths 54a-54c of the active set 50 are weak and the forward frame error rate is above a target frame error rate, this indicates a call drop is highly likely. In this case, the current $P_{ref}$ value may be increased by a "$P_{ref}$_Up" step (e.g., a designated incremental value) in an attempt to avoid a call drop. Thus, the system initially compares a forward link feedback value (namely, the pilot signal strength Ec/Io) for each active leg to a feedback parameter. Here, the feedback parameter may be a designated pilot signal threshold that is considered to correspond to a weak signal in the network 12. The system also compares another forward link feedback value (namely, the forward link frame error rates) to another, applicable feedback parameter, such as a target or threshold forward link frame error rate. Based on these comparisons, a power control parameter (e.g., $P_{ref}$) of each leg 52a-52c in the active set 50 may be adjusted. For example, if all the pilot signal strengths 54a-54c are below the pilot threshold (indicating weak signals), and if the forward link frame error rate(s) is greater than a target frame error rate, the current $P_{ref}$ setting is adjusted upwards by $P_{ref}$_Up dB.

Figure 5:
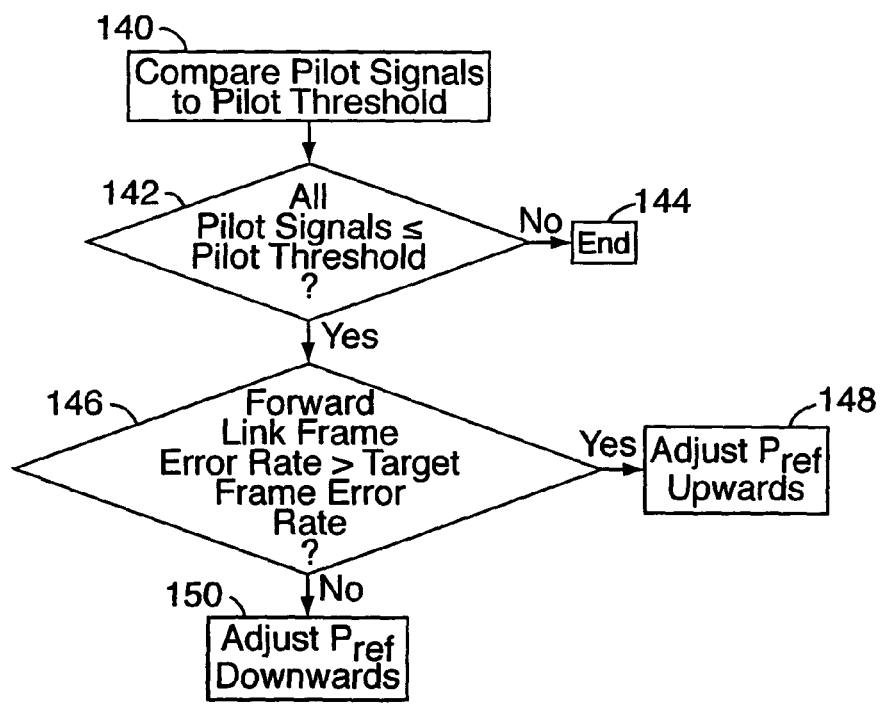

This process is illustrated with reference to FIG. 5. At Step 140, the pilot signal strengths 54a-54c are compared to a pilot threshold value. At Step 142, it is determined if all the pilot signal strengths 54a-54c are less than or equal to the pilot threshold. Again, the pilot threshold is value that corresponds to what is considered a "weak" pilot signal in the network 12. If not, the process ends at Step 144. If so, at Step 146 it is determined if the forward traffic channel frame error rate (measured at the wireless unit 16) is greater than a target forward link frame error rate. The forward link frame error rate may be a composite for all the active legs, or the determination may be made for each active leg 52a-52c. If the forward link frame error rate is greater than the target rate (or if the frame error rate for every active leg 52a-52c is greater than the target rate), then at Step 148 the current $P_{ref}$ setting for each leg 52a-52c is adjusted upwards by $P_{ref}$_Up dB:

IF all Ec/Io≤pilot threshold

AND IF forward link frame error rate>target frame error rate

THEN increase $P_{ref}$ by $P_{ref}$_Up dB

If this is not the case, then the process may end. However, the system may be further configured to adjust the $P_{ref}$ level downwards, as at Step 150, if the forward link traffic channel frame error rate(s) is found to be less than the target frame error rate:

IF forward link frame error rate≤target frame error rate

THEN decrease $P_{ref}$ by $P_{ref}$_Down dB

As noted, $P_{ref}$ (or another power control parameter) is adjusted based on comparisons between forward link feedback and one or more feedback parameters (comparison values). As indicated in the table above, forward link quality feedback may be determined from PMRM's received from the wireless unit 16. A PMRM is a power measurement report message sent by a wireless unit, e.g., if there are a particular number of frame errors within a particular number of frames (indicating poor quality channel conditions). Forward link feedback may also be determined from PSMM's (pilot strength measurement messages), from PPSMM's (periodic pilot strength measurement messages), or the like.

As should be appreciated, the setting or adjustment of $P_{ref}$ may or may not have an immediate effect upon the actual forward link transmit power of a base station. For example, if the base station's traffic channel transmit power is already set at $P_{ref}$ due to bit errors in the power control commands received from a wireless unit, then a downwards adjustment of $P_{ref}$ (e.g., because the pilot signal strength of the base station is significantly less than a maximum pilot signal strength in the wireless unit's active set 50) will result in a reduction in transmission power. If the $P_{ref}$ level is adjusted downwards (due to low pilot signal strength) but the base station is not yet set to transmit at the $P_{ref}$ level (e.g., the pilot signal strength is low but there are no or few power control command bit errors), this will have no effect on the transmission power level until the base station is set to transmit at $P_{ref}$. (Of course, once the base station is set to transmit at $P_{ref}$, the transmission power level will be lower than it otherwise would have been were $P_{ref}$ not adjusted downwards.) Usually, the circumstances for adjusting $P_{ref}$ downwards means that a base station is already or soon will be set to transmit at the $P_{ref}$ level.

The functionality of the system 10 as described with reference to FIGS. 3A-5 may be implemented by way of a script, computer program or suite of computer programs, hardware module, or a hardware/software module in place on the MSC 26 and/or base stations 14a-14c and configured to operate in conjunction with the MSC, base stations, and/or handoff module 44.

Since certain changes may be made in the above-described method for adjusting forward link power control parameters based on forward link quality feedback, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method for communicating with a wireless unit over a network having a plurality of base stations, the method comprising:
    comparing at least one forward link feedback value of each of a plurality of legs in an active set of the wireless unit to at least one forward link feedback parameter, wherein each of the plurality of legs is associated with a respective base station and the plurality of legs define the active set for the wireless unit; and
    determining whether to adjust a power control parameter of at least one of the plurality of legs based on the comparison;
    wherein the power control parameter of the at least one of the plurality of legs is adjusted independently of adjustments to other legs in the active set.

2. The method of claim 1 further comprising:
    setting a transmit power level of the at least one of the plurality of legs based on the power control parameter.

3. The method of claim 2 wherein:
    the forward link feedback value for each of the plurality of legs is a pilot signal strength of the leg; and the method further comprises determining a maximum of the pilot signal strengths, wherein the at least one feedback parameter is the maximum pilot signal strength.

4. The method of claim 3 wherein:

the power control parameter of each of the plurality of legs is a forward link reference transmit power (Pref) level;

the Pref level of any of the plurality of legs is set to a minimum Pref level when the difference between the maximum pilot signal strength and the pilot signal strength of the leg is greater than a first comparison threshold; and the Pref level of any of the plurality of legs is set at an initial Pref level when the difference between the maximum pilot signal strength and the pilot signal strength of the leg is less than a second comparison threshold.

5. The method of claim 2 wherein:

the at least one forward link feedback value for each of the plurality of legs is a frame error rate and a pilot signal strength of the leg;

the at least one feedback parameter comprises a pilot signal threshold and a target forward link frame error rate;

a power control parameter of each of the plurality of legs is adjusted upwards by a first incremental value when the pilot signal strength of each of the plurality of legs is less than the pilot signal threshold and the frame error rate is greater than the target forward link frame error rate; and the power control parameter of each of the plurality of legs is adjusted downwards by a second incremental value when the frame error rate is less than the target forward link frame error rate;

wherein the power control parameter of each of the plurality of leg is adjusted independently of adjustments to the other legs in the active set.

6. The method of claim 5 wherein the power control parameter is at least one of a forward link reference transmit power level, a forward link minimum transmit power level, and a forward link maximum transmit power level.

7. The method of claim 1, wherein the plurality of legs are handoff legs.

* * * * *